US011377010B2

(12) United States Patent
Yang

(10) Patent No.: US 11,377,010 B2
(45) Date of Patent: Jul. 5, 2022

(54) SIDE DOOR CAR CAMPER

(71) Applicant: Kevin Yang, Rolling Hills Estate, CA (US)

(72) Inventor: Kevin Yang, Rolling Hills Estate, CA (US)

( * ) Notice: Subject to any disclaimer, the term of this patent is extended or adjusted under 35 U.S.C. 154(b) by 828 days.

(21) Appl. No.: 16/262,736

(22) Filed: Jan. 30, 2019

(65) Prior Publication Data

US 2020/0238879 A1 Jul. 30, 2020

(51) Int. Cl.

| | |
|---|---|
| ***B60N 3/00*** | (2006.01) |
| ***B60J 11/06*** | (2006.01) |
| ***E04H 15/06*** | (2006.01) |
| ***A47B 31/06*** | (2006.01) |

(52) U.S. Cl.
CPC .............. *B60N 3/008* (2013.01); *A47B 31/06* (2013.01); *B60J 11/06* (2013.01); *E04H 15/06* (2013.01)

(58) Field of Classification Search
CPC ........... B60N 3/008; A47B 31/06; B60J 11/06
See application file for complete search history.

(56) References Cited

U.S. PATENT DOCUMENTS

| | | | | |
|---|---|---|---|---|
| 1,370,227 A * | 3/1921 | Schilke | B60N 3/008 5/119 |
| 1,418,287 A * | 6/1922 | Cooper | B60N 3/008 5/55.1 |
| 3,625,161 A * | 12/1971 | Rosner | A47B 31/06 108/44 |
| 6,073,964 A * | 6/2000 | Smith | B60J 11/06 280/770 |
| 2002/0139403 A1* | 10/2002 | Shi | B60R 11/0235 135/25.4 |
| 2015/0059089 A1* | 3/2015 | Falkiner | B60N 3/008 5/110 |
| 2018/0072208 A1* | 3/2018 | Howe | A47B 5/06 |
| 2019/0263306 A1* | 8/2019 | Welch | B60N 2/345 |

* cited by examiner

*Primary Examiner* — Matthew W Ing
(74) *Attorney, Agent, or Firm* — Clement Cheng

(57) ABSTRACT

A car tent camper has a flexible rod with a flexible rod upper tip and a flexible rod lower tip. The flexible rod upper tip is configured to engage a door window frame. The flexible rod lower tip is configured to engage a latch loop. An extension is formed as a planar plank. The extension is connected to a horizontal frame member at an extension base. The extension base has a horizontal frame member inside foot and an upright foot. The horizontal frame member inside foot is mounted opposite to the upright foot. A first anchor hook strap is connected to a first extension support, and the first extension support is mounted to the extension. A second anchor hook strap is connected to a second extension support, and the second extension support is mounted to the extension.

16 Claims, 6 Drawing Sheets

SIDE DOOR CAR CAMPER

FIELD OF THE INVENTION

The present invention is in the field of car tent campers.

DISCUSSION OF RELATED ART

A variety of different car tents have been patented. For example, a Korean patent publication 10-2018-0121299 suggests to install a box shaped tent over an open window to allow a user to sleep with their feet extended out of the window. Japanese reference JP2010179903A to inventor Taketomi entitled On Vehicle Umbrella teaches a fan shaped tent over an open front door of an automobile. Japanese reference JP2015063815A by inventor Yoshinobu Maruo entitled Vehicle Door Tent provides a tent designed to rest on the ground and be connected to the side door of an automobile. Also, U.S. Pat. No. 1,803,237 entitled Portable Shelter Or Tent For Attachment To Automobiles issued Apr. 28, 1931 by inventor C. E. Crooke shows a tent frame that can be connected to the exterior surface of an automobile.

SUMMARY OF THE INVENTION

A car tent camper has a flexible rod with a flexible rod upper tip and a flexible rod lower tip. The flexible rod upper tip is configured to engage a door window frame. The flexible rod lower tip is configured to engage a latch loop. An extension is formed as a planar plank. The extension is connected to a horizontal frame member at an extension base. The extension base has a horizontal frame member inside foot and an upright foot. The horizontal frame member inside foot is mounted opposite to the upright foot. A first anchor hook strap is connected to a first extension support, and the first extension support is mounted to the extension. A second anchor hook strap is connected to a second extension support, and the second extension support is mounted to the extension. The second extension support is mounted laterally from the first extension support. A right anchor hook is connected to the right anchor hook strap, and the right anchor hook is configured to engage the latch loop. A left anchor hook is connected to the left anchor hook strap. The left anchor hook is configured to engage a headrest post.

The first extension support can be a left extension support, and the second extension support can be a right extension support. The left extension support can be mounted to the left of the right extension support. The car tent camper optionally has the first anchor hook strap configured as a left anchor hook strap, and second anchor hook strap being a right anchor hook strap. The right anchor hook strap is preferably mounted to the right of the left anchor hook strap.

The first extension support also has a first connection ring, and the first anchor hook strap is connected to the first connection ring. The first connection ring is mounted to the extension. The second extension support further includes a second connection ring. The second anchor hook strap is connected to the second connection ring. The second connection ring is mounted to the extension. The flexible rod has a first rod section and a second rod section. The first rod section is connected to the second rod section at a rod connector sleeve. The rod connector sleeve provides a detachable connection.

The upright foot is connected to the horizontal frame member at an upright foot swivel joint. The car tent also has a tent cover which is formed as a sheet that can be made of fabric. The tent cover is configured to fit over the flexible rod and the extension and can be connected to the flexible rod and extension. The tent cover can be connected to the flexible rod by having a sleeve type connection. The tent cover includes a top magnet bar for connecting to a car body, and a car body magnet bar.

The following call out list of elements can be a useful guide in referencing the element numbers of the drawings.

20 Flexible Rod
21 Flexible Rod Upper Tip
22 Flexible Rod Lower Tip
23 First Rod Section
24 Second Rod Section
25 Rod Connector Sleeve
30 Main Body
31 Latch Loop
32 Door Opening
33 Door
34 Door Pocket
35 Seat
36 Cabin Floor
37 Rear Window Frame
38 Rear Window Frame Indent Corner
41 Headrest
42 Headrest Post
43 Backrest
50 Extension
51 Extension Base
52 Right Extension Support
53 Left Extension Support
54 Horizontal Frame Member
55 Left Anchor Hook
56 Horizontal Frame Member Inside Foot
57 Right Anchor Hook
58 Upright Foot
61 Foot Tip Tapered Edge
52 Horizontal Frame Member Lower Edge
63 Horizontal Frame Member Inside Foot Tip
64 Upright Foot Swivel Joint
65 Left Anchor Hook Strap
66 Right Anchor Hook Strap
67 Left Connection Ring
68 Right Connection Ring
69 Insertion Surface
70 Tent Cover
71 Top Magnet Bar
72 Car Body Magnet Bar
73 Car Door Magnet Bar
74 Tent Cover Bottom Edge
75 Door Pocket
76 Supplemental Strap
77 Inside Support

DETAILED DESCRIPTION OF THE PREFERRED EMBODIMENT

Figure 1:
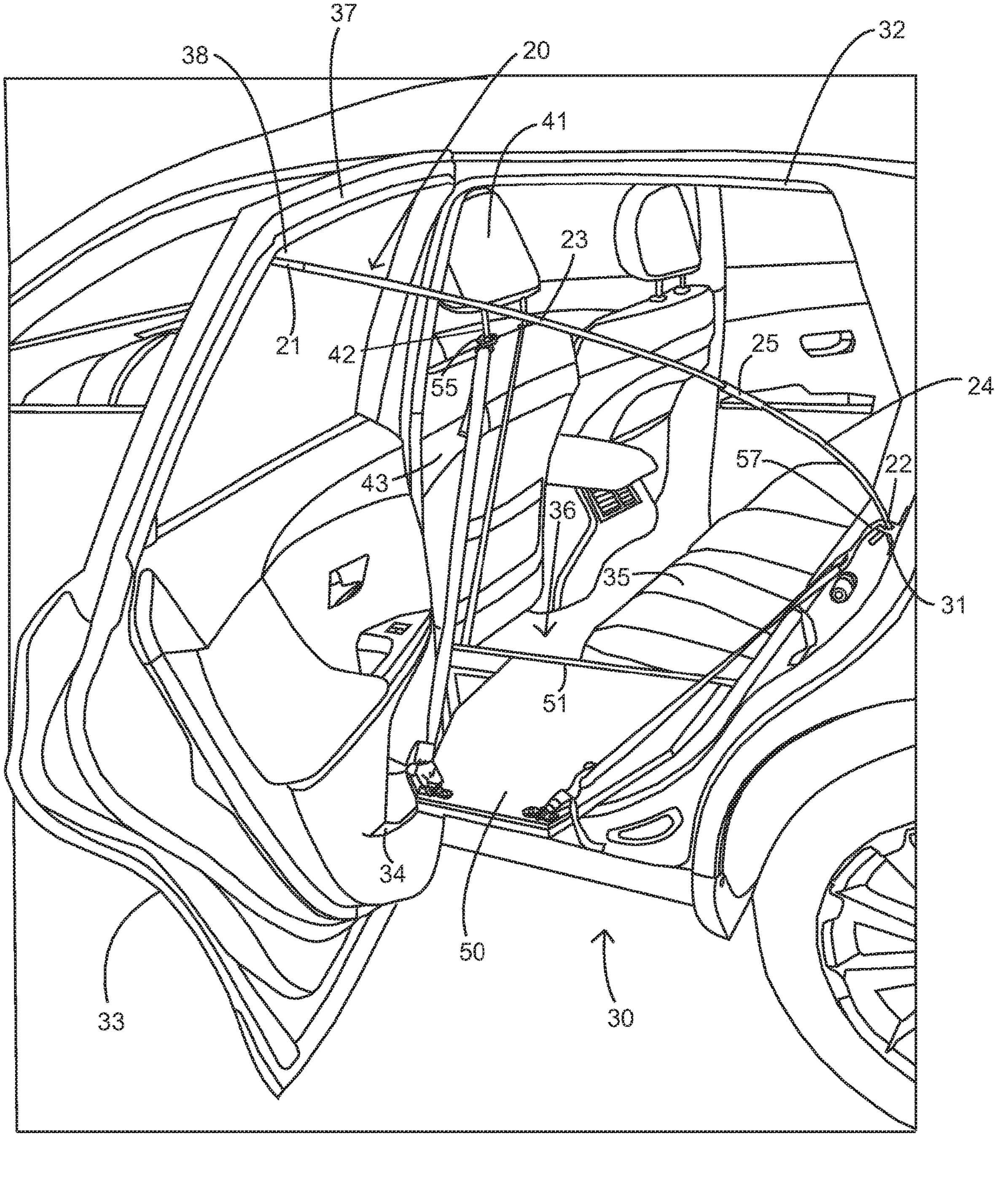
FIG. 1 is a perspective view of the present invention.

As seen in FIG. 1, a car tent camper is configured to be installed in a rear side door of an automobile such as a sedan.

The tent is installed when the rear side door of the automobile is in an open position. A flexible rod 20 has a flexible rod upper tip 21 and a flexible rod lower tip 22. The flexible rod also has a rod connector sleeve 25. The rod connector sleeve 25 connects a first Rod section 23 to a second Rod section 24. The rod sections can detach from the connector sleeve 25 and fold for storage. The flexible rod upper tip 21 can be lodged in a rear window frame indent corner 38 of a rear window frame 37 of a car door 33. The car door 33 extends from the main body 30. The main body 30 has a latch loop 31 which is typically a metal loop that receives the door latch, but in this case is repurposed for receiving the flexible rod lower tip 22, which is configured to insert into the latch loop 31. The flexible rod lower tip 22 can be a metal sheathing fit over a fiberglass rod. The flexible rod is preferably a fiberglass rod that has a pair of opposing ends that are cylindrical and capped with aluminum end caps. The aluminum end caps preferably include a rounded tapered tip.

Figure 2:
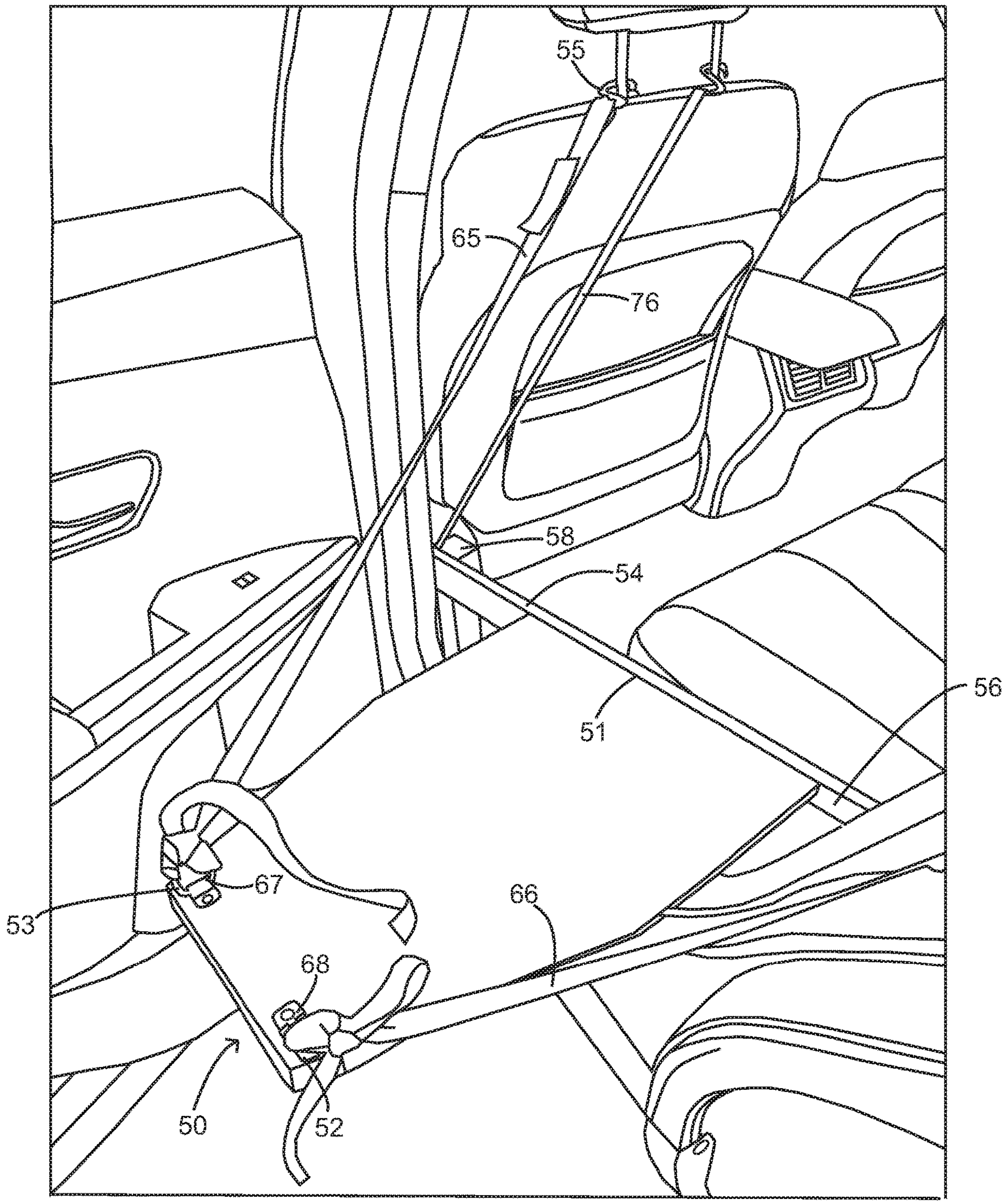
FIG. 2 is a close-up perspective view of the present invention.

The right anchor hook is also engaged to the latch loop 31. The right anchor hook is connected to the hook strap 66 and the hook strap is connected to a right extension support 52. As seen in FIG. 2, optionally, the hook strap can be connected to the right extension support 52 at a right connection ring 68. Similarly, a left anchor hook 55 can connect to a headrest post 42. The headrests post 42 is between the headrest 41 and the backrest 43. The backrest 43 of the vehicle is padded and the headrest 41 of the vehicle is also padded, but the headrest post 42 is typically a solid stainless steel post that can receive a hook. The hook is preferably metal but coated with a soft grippy cover.

The left anchor hook 55 maintains the position of the left anchor hook strap 65, which in turn supports the left connection ring 67 of the left extension support 53. Left extension support 53 is connected to the extension 50 formed as a plank. The right connection ring exterior of the right extension support 52 similarly is connected to the right anchor hook strap 66 which is connected to the right anchor hook 57. The right anchor hook 57 is first engaged to the latch loop 31 and then the length of the right anchor hook strap 66 can be adjusted in length. Similarly, the left anchor hook strap 65 can also be adjusted in length. The right anchor hook strap 66 can be a nylon strapping. The latch loop 31 is preferably bolted to the main body 30 by a pair of bolts.

The extension 50 has an extension base 51 at an inside portion of the extension 50. The extension base 51 is connected to a horizontal frame member 54. The horizontal frame member 54 has an upright foot 58 at a front end and a horizontal frame member inside foot 56 at a rear end. The horizontal frame member inside foot 56 fits between the rear seat cushion and the main body 30 of the vehicle. The upright foot 58 extends downwardly from the horizontal frame member 54. The upright foot 58 rests on and is supported by the cabin floor 36.

Figure 3:
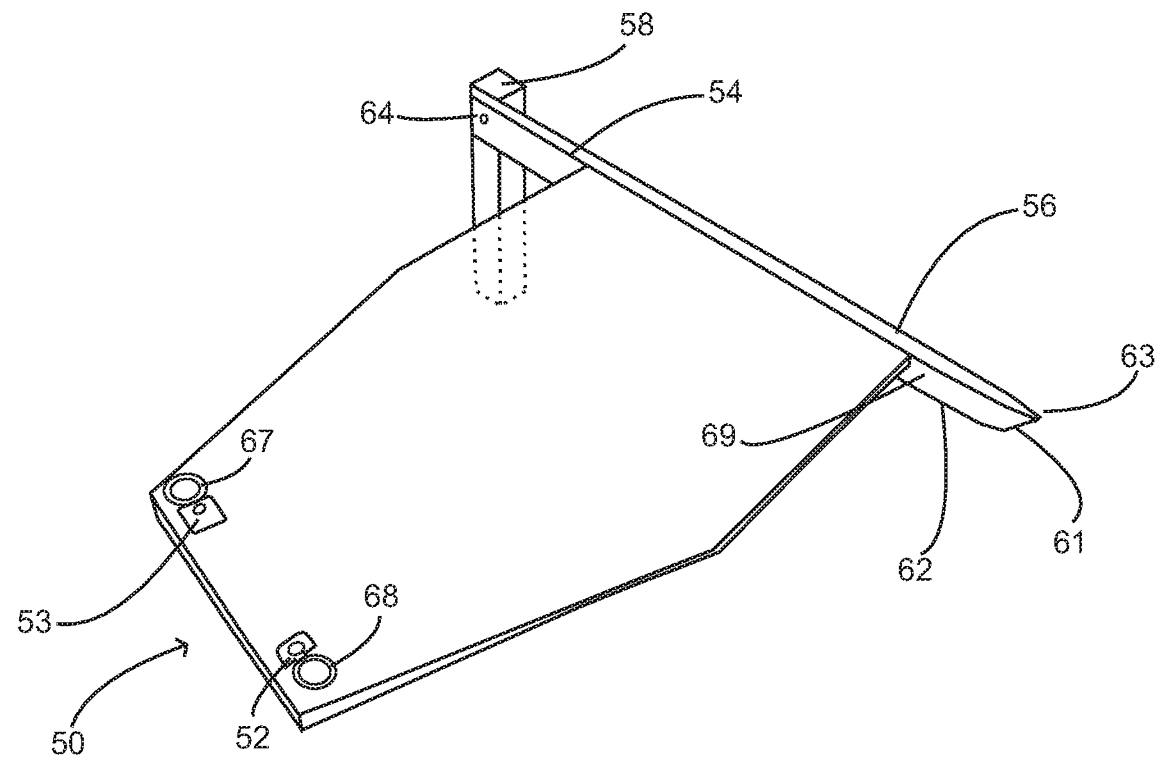
FIG. 3 is a diagram of the board portion of the present invention.

As seen in FIG. 3, the upright foot can be mounted with an upright foot swivel joint 64 that can be height adjustable for selecting a height of the upright foot. For example, the upright foot swivel joint or can be moved up or down so that the upright foot 58 can be mounted in multiple configurations relative to the horizontal frame member before. The multiple configurations can correspond with different heights and angles.

Additionally, the horizontal frame member 54 can be flexible in a side-to-side direction and not flexible in and up to down direction. The horizontal frame member 54 preferably is rigid in a vertical direction, but slightly flexible in a horizontal direction. The horizontal frame member has a rear end that is formed as a horizontal frame member inside foot 56. The horizontal frame member inside foot 56 has a horizontal frame member lower edge 62 and an insertion surface 69 defined between the horizontal frame member lower edge 62 and an upper edge of the horizontal frame member. The foot tip tapered edge 61 can be blade shaped for engagement to secure the horizontal frame member relative to the vehicle. The foot tip tapered edge 61 preferably extends to a horizontal frame member inside foot tip 63 that is pointed for ease of insertion.

Figure 4:
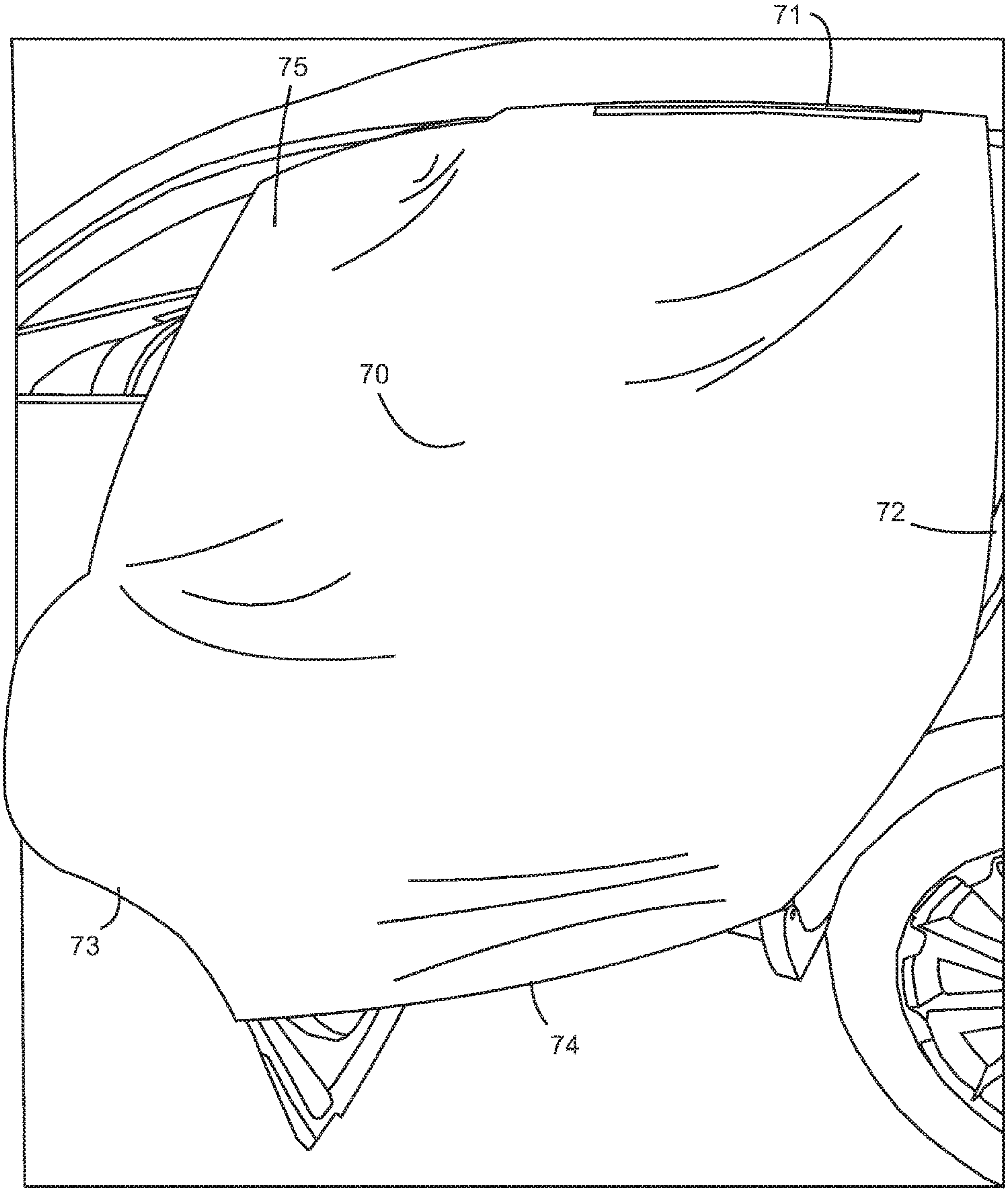
FIG. 4 is an external side view of the present invention.
Figure 5:
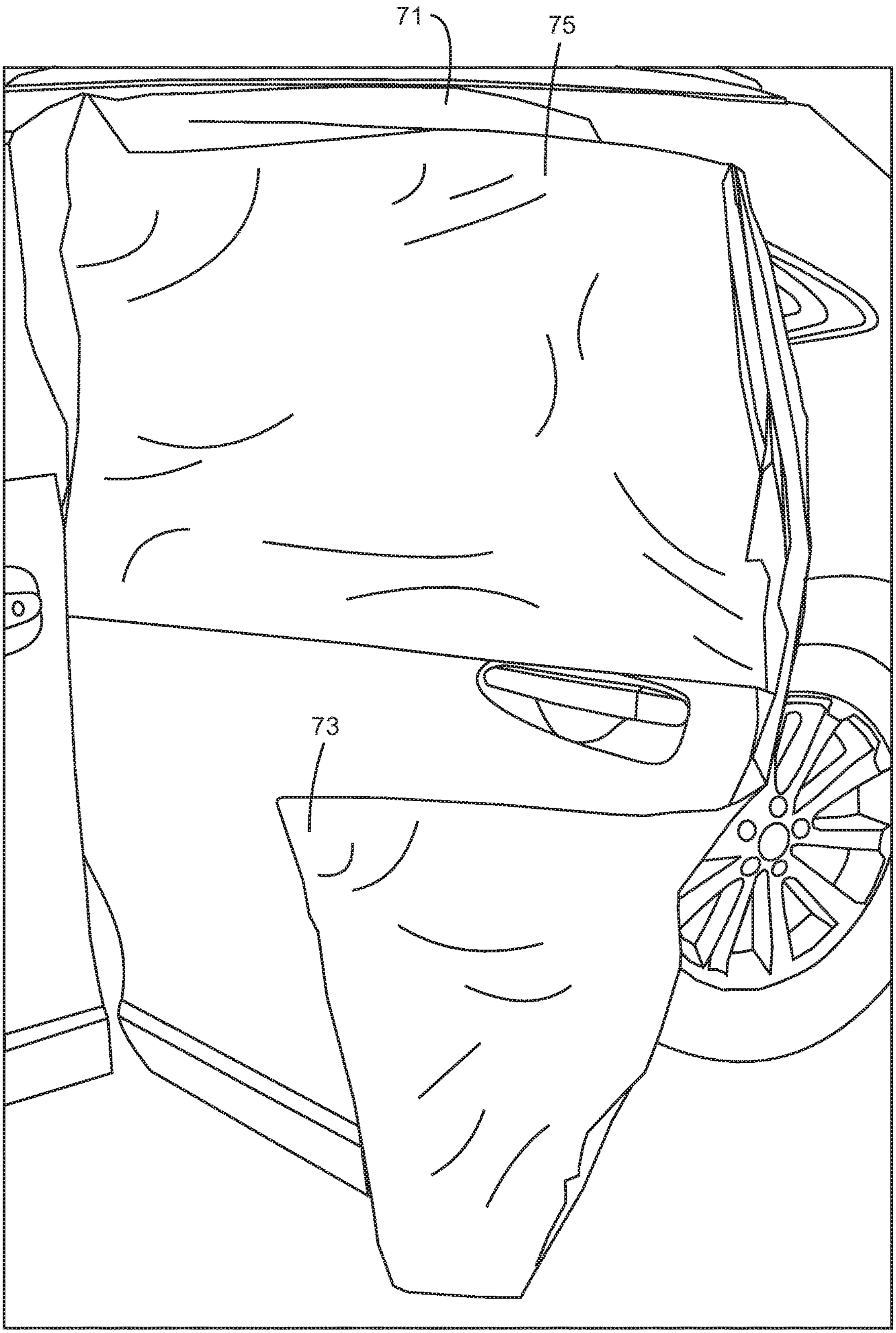
FIG. 5 is an external front view of the present invention.

As seen in FIG. 4, the tent cover 70 fits over the door of a sedan and is held down with a top magnet bar 71. The car body magnet bar 72 and the car door magnet bar 73 provide a secure connection to the left and right sides of the tent cover 70. The tent cover bottom edge 74 can be a weighted flap. The upper portion of the cover can have a door pocket 75 for receiving a portion of the door of the car. As seen in FIG. 5, the car door magnet bar 73 can also be placed on the outside surface of the car door instead of on the edge of the car door as seen in FIG. 4. The tent cover can be connected to the flexible rod such as by providing a sleeve for the flexible rod on the tent cover, or by providing hooks on the tent cover for connecting to the flexible rod. Similarly, the tent cover can be connected to the extension such as by providing a flexible connector.

Figure 6:
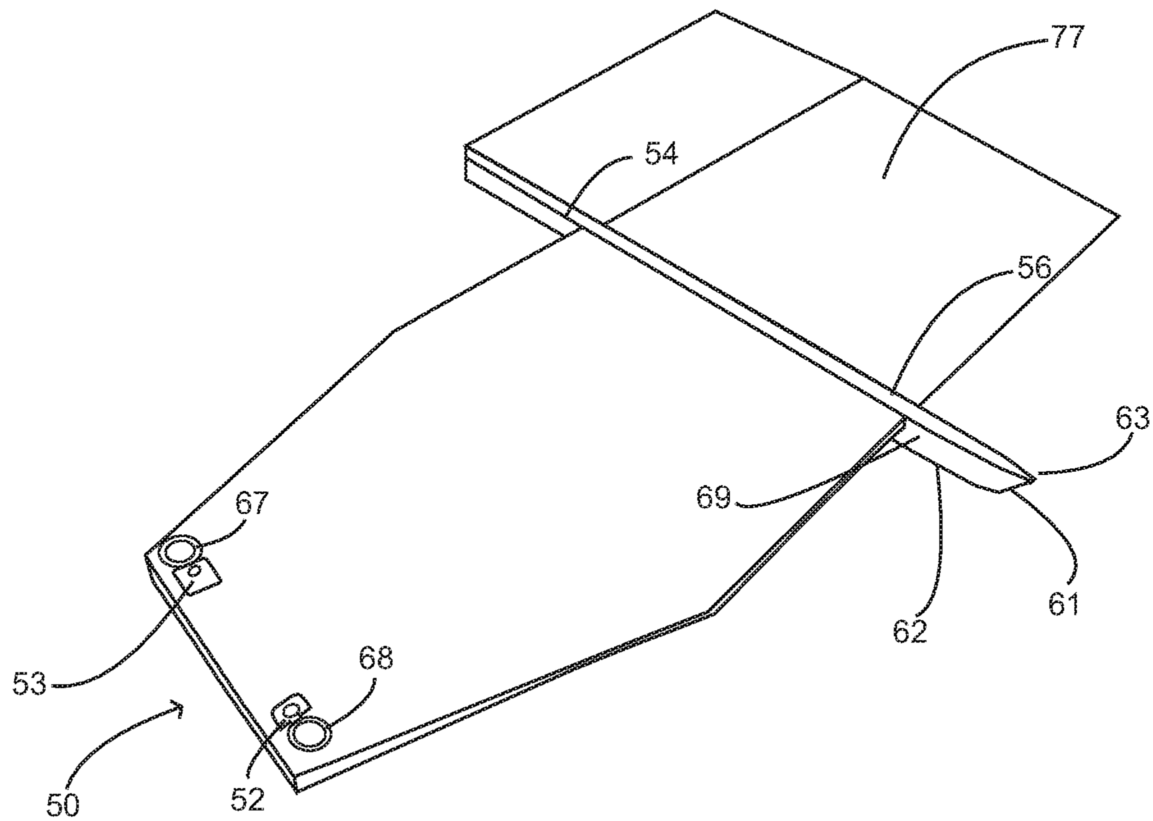
FIG. 6 is a diagram of the present invention showing the assembly of the inside support.

Alternatively as seen in FIG. 6, a supplemental strap 76 as seen in FIG. 1 can replace the upright foot 58. The supplemental strap 76 may also additionally stabilize and support an inside support 77 and can be used in conjunction with the folding foot. The inside support 77 can be formed as a plank that is connected to the horizontal frame member 54. The inside support 77 is preferably parallel to the extension 50, but it can also be formed at an angle to the extension 50 for example by being hinged to extension 50 so that it folds together with extension 50. The supplemental strap 76 is configured to connect to a headrest post, such as a second headrest post that is not being connected to. The inside support 77 is preferably removably detachable.

Although the preferred embodiment is shown in a particular orientation being installed on the right rear door, the car tent camper can also be installed on the right front door, the left front door, or the left rear door. During use, the user provides a mattress or can lay on the rear seats while extending the feet on the extension. The tent cover can have a screen for allowing air exchange.

The invention claimed is:

1. A car tent camper comprising:

a. a flexible rod having a flexible rod upper tip and a flexible rod lower tip, wherein the flexible rod upper tip is configured to engage a door window frame, wherein the flexible rod lower tip is configured to engage a latch loop;

b. an extension formed as a planar plank, wherein the extension is connected to a horizontal frame member at an extension base, wherein the extension base has a horizontal frame member inside foot;

c. a first anchor hook strap connected to a first extension support, wherein the first extension support is mounted to the extension, and further comprising a second anchor hook strap connected to a second extension support, wherein the second extension support is mounted to the extension, wherein the second extension support is mounted laterally from the first extension support;

d. a right anchor hook connected to a right anchor hook strap, wherein the right anchor hook is configured to engage the latch loop; and a left anchor hook connected to a left anchor hook strap, wherein the left anchor hook is configured to engage a headrest post.

2. The car tent camper of claim 1, wherein the first extension support is a left extension support, and wherein the second extension support is a right extension support, wherein the left extension support is mounted to the left of the right extension support.

3. The car tent camper of claim 1, wherein the first anchor hook strap is mounted to the left of the right anchor hook strap, wherein the right anchor hook strap is mounted to the right of the left anchor hook strap.

4. The car tent camper of claim 1, wherein the first extension support further includes a first connection ring, wherein the first anchor hook strap is connected to the first connection ring, wherein the first connection ring is mounted to the extension.

5. The car tent camper of claim 4, wherein the second extension support further includes a second connection ring, wherein the second anchor hook strap is connected to the second connection ring, wherein the second connection ring is mounted to the extension.

6. The car tent camper of claim 4, wherein the flexible rod has a first rod section and a second rod section, wherein the first rod section is connected to the second rod section at a rod connector sleeve, wherein the rod connector sleeve provides a detachable connection.

7. The car tent camper of claim 1, wherein an upright foot is connected to the horizontal frame member at an upright foot swivel joint.

8. The car tent camper of claim 1, further including a tent cover, wherein the tent cover is configured to fit over the flexible rod and the extension.

9. The car tent camper of claim 8, wherein the tent cover is connected to the flexible rod, wherein the tent cover includes a top magnet bar for connecting to a car body, and a car body magnet bar, and further comprising an upright foot, wherein the horizontal frame member inside foot is mounted opposite to the upright foot.

10. The car tent camper of claim 9, wherein the first extension support is a left extension support, and wherein the second extension support is a right extension support, wherein the left extension support is mounted to the left of the right extension support.

11. The car tent camper of claim 9, wherein the first anchor hook strap is a left anchor hook strap, and where the second anchor hook strap is a right anchor hook strap, wherein the right anchor hook strap is mounted to the right of the left anchor hook strap.

12. The car tent camper of claim 9, wherein the first extension support further includes a first connection ring, wherein the first anchor hook strap is connected to the first connection ring, wherein the first connection ring is mounted to the extension.

13. The car tent camper of claim 12, wherein the second extension support further includes a second connection ring, wherein the second anchor hook strap is connected to the second connection ring, wherein the second connection ring is mounted to the extension.

14. The car tent camper of claim 12, wherein the flexible rod has a first rod section and a second rod section, wherein the first rod section is connected to the second rod section at a rod connector sleeve, wherein the rod connector sleeve provides a detachable connection.

15. The car tent camper of claim 9, wherein an upright foot is connected to the horizontal frame member at an upright foot swivel joint.

16. The car tent camper of claim 1, further including a tent cover, wherein the tent cover is configured to fit over the flexible rod and the extension, wherein the tent cover is connected to the flexible rod, wherein the tent cover includes a top magnet bar for connecting to a car body, and a car body magnet bar, and further comprising a supplemental strap, wherein the supplemental strap supports an inside support, wherein the inside support is formed as a plank that is connected to the horizontal frame member.

* * * * *